March 8, 1932.  M. G. HARNDEN  1,848,250
ICE CREAM DIEING OUT MACHINE
Filed Sept. 3, 1929  3 Sheets-Sheet 2

Fig. 2.

INVENTOR
Millard G. Harnden
BY
Harry Bowen
ATTORNEY

March 8, 1932. M. G. HARNDEN 1,848,250
ICE CREAM DIEING OUT MACHINE
Filed Sept. 3, 1929 3 Sheets-Sheet 3
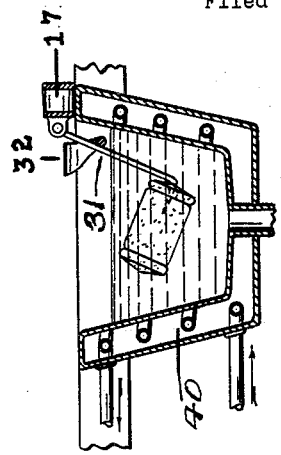
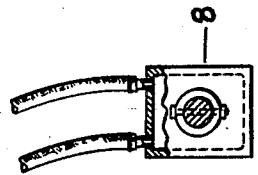
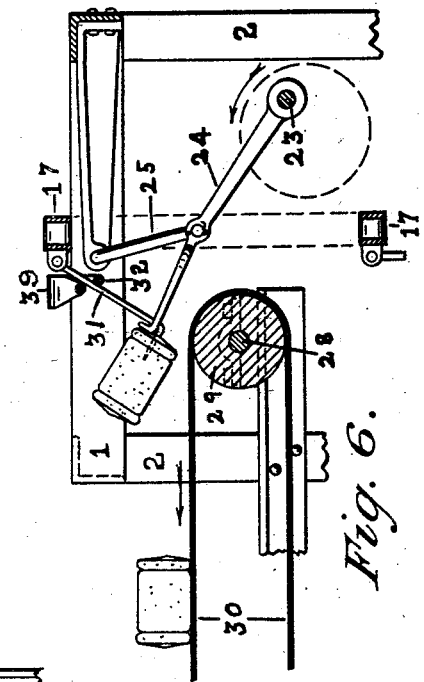
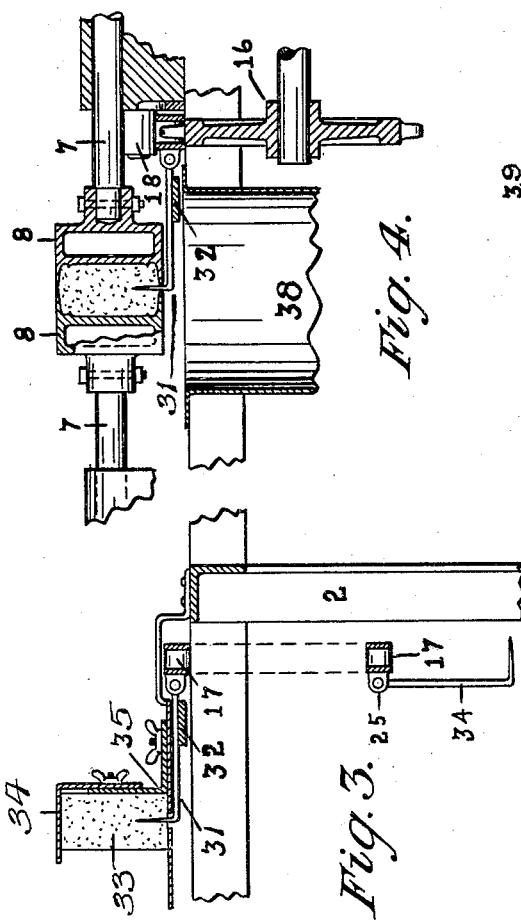
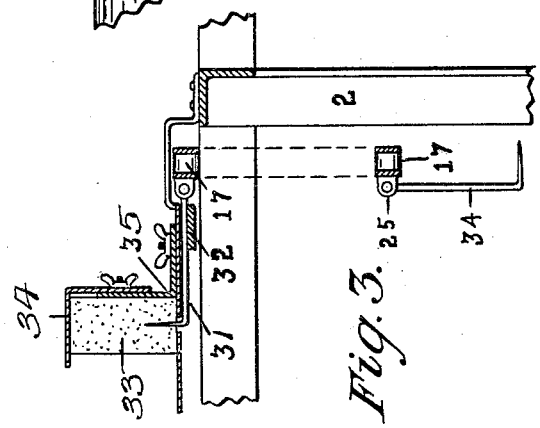
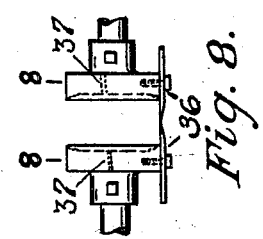
INVENTOR
Millard G. Harnden
BY
Harry Bowen
ATTORNEY Patented Mar. 8, 1932

1,848,250

UNITED STATES PATENT OFFICE

MILLARD GEORGE HARNDEN, OF SEATTLE, WASHINGTON

ICE CREAM DIEING OUT MACHINE

Application filed September 3, 1929. Serial No. 390,107.

My invention relates to a machine for dieing out ice cream into shapes resembling fruits, flowers, animals, and etc., by means of two dies operated in conjunction with an endless feeder chain; and the objects of my invention are, first, to produce ice cream of various shapes and forms with less labor than is required by hand molding, second, to make these ice cream forms more rapidly than can be done by hand with the common ice cream molds, and third, to reduce the cost of making these ice cream forms and thereby to increase the consumption of molded ice cream.

I attain these objects by the mechanism illustrated in the accompanying drawings, in which—

Figure 2 is a side elevation of the entire machine.

Figure 3 is a cross section through the machine on line 3—3 of Figure 1 showing the means for holding the ice cream, with parts omitted.

Figure 4 is a section through the dies on line 4—4 of Figure 1 with parts omitted.

Figure 5 is a section through a dipping vat taken on line 5—5 of Figure 1.

Figure 6 is a cross section on line 6—6 of Figure 1 with parts omitted, showing a device for kicking ice cream off of the chain.

Figure 7 is a detail showing one of the dies with part broken away.

Figure 8 is a detail showing an alternate arrangement of the dies with knives attached thereto.

Similar numerals refer to similar parts throughout the several views.

Figure 1:
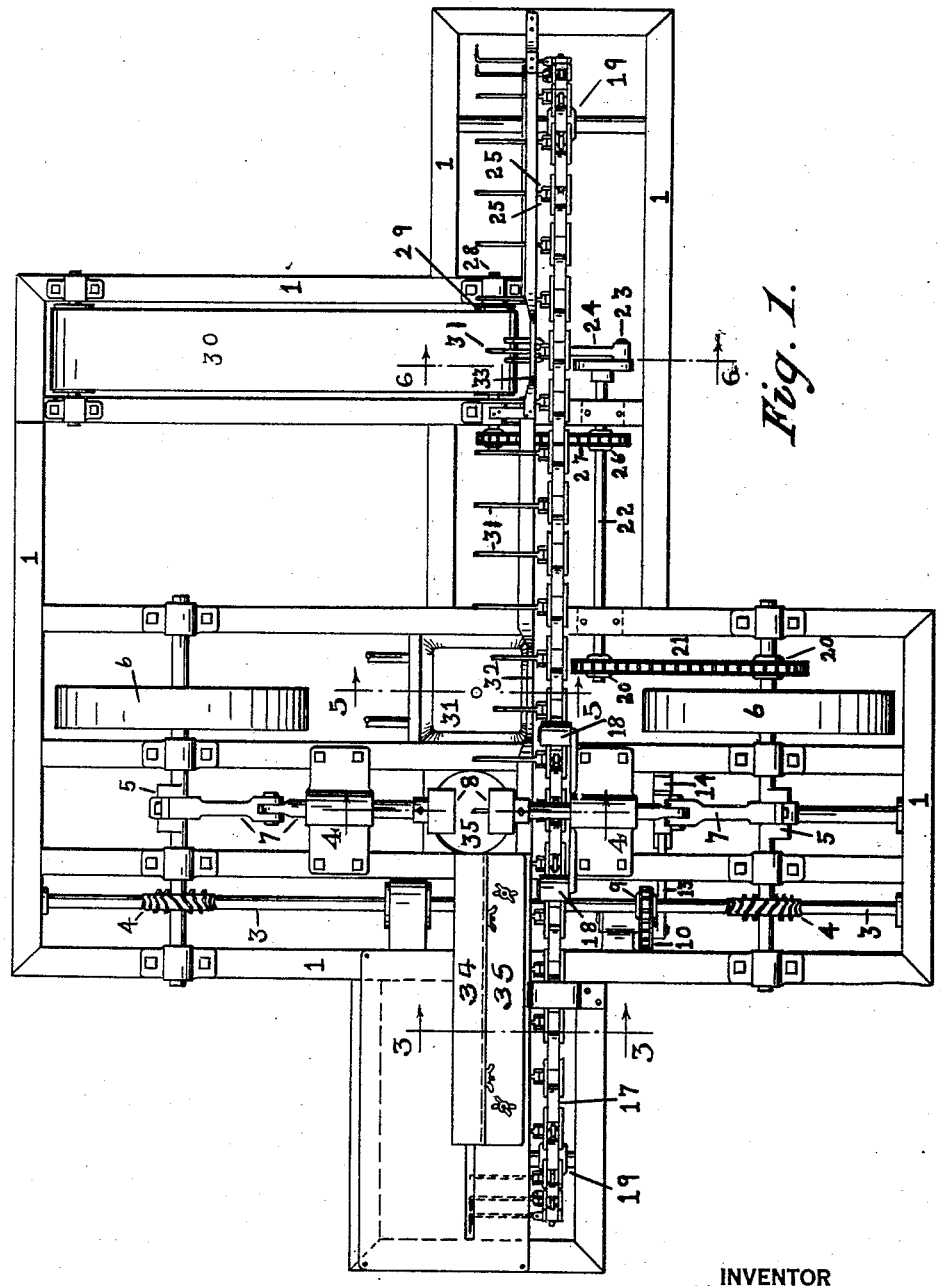
Figure 1 is a top plan view of the entire machine.

The framework 1, and the several legs 2, constitute the main body of the machine.

By means of suitable power and belts a rotating motion is given to the drive shaft 3, which by means of worm gears 4, rotate the two crankshafts 5, on which are the fly wheels 6. The crankshaft 5, through the jointed rods 7, impart a reciprocating motion to the dies 8.

The drive shaft 3, has a sprocket wheel 9, which by means of a chain 10, rotates the sprocket wheel 11, on which is attached a crankpin 12, carrying a reciprocating pawl 13, which contacts and causes the ratchet wheel 14, fastened on the shaft 15, to rotate intermittently. The sprocket wheel 16, attached on the shaft 15, is the drive wheel for the endless chain 17, and through the action of the pawl 13, and ratchet wheel 14, and connecting parts causes the chain 17, to travel intermittently, the whole being so timed so the chain 17, will be standing idle at the time the dies 8, 8, are closing. The chain 17, is held in contact with the sprocket wheel 16, by the idlers 18, 18. Sprocket wheels 19—19, are idlers on which the chain 17, rides.

The crankshaft 5, by means of the sprocket wheels 20—20, and chain 21, transmits a rotating motion to shaft 22, which has a crank pin 23, on the opposite end from the sprocket wheel 20. On crankpin 23, is attached the reciprocating member 24 (termed hereafter the kicker,) which kicks the molded ice cream off of the hooks onto an endless belt 30. The kicker 24, is guided by the hanging arm 25.

By means of the sprocket wheels 26—26 and chain 27, a rotating motion is transmitted to the shaft 28, which in turn rotates the pulley 29, on which rides the endless belt 30. Said endless belt carries the molded ice cream to those who pack it as it is kicked off from the hooks by the kicker 24. The parts giving motion to the kicker 24 are so timed with the whole that the kicker kicks the molded ice cream off the hooks of the endless chain 17 at the time said chain is stationary.

The endless chain 17, differs from ordinary chains in that one side of desired links has two projections between which is hung a hook as 31. (See Figures 1 and 3.)

The hooks of the endless chain are lifted by the track 32, Figures 2 and 3, as they start forward and due to a gradual rise of the track 32, are forced into the ice cream strips 33 as shown, Fig. 3. Thus the ice cream is carried forward intermittently as the endless feeder chain 17 moves and is fed automatically to the dies 8—8. Parts 34—35 are adjustable for various sized strips of ice cream.

Fig. 4 shows the dies 8—8 at completion of their forward motion showing the manner in which the ice cream is died out allowing a hook from the endless chain to remain imbedded.

Fig. 8 shows an optional construction for the dies with the addition of adjustable knives, 36, and air vents 37.

Underneath the dies Fig. 2, is a funnel 38, for the waste cream to drop through.

Fig. 5 shows the preferred construction of a dipping vat 40, with steam pipes, which may be used in putting a coating on the molded ice cream if so desired.

The track 32, which guides the hooks of the endless chain is given a half circular depression over the dipping vat, thus as the hooks reach this section of the track, gravity causes them to assume a position, for a short distance, of an angle below the horizontal. While in this position molded ice cream on the hooks is immersed in the contents of the vat.

Fig. 6 shows the preferred method of construction for the kicker which kicks the molded ice cream off of the hooks. The tracks 32—33, are shaped to guide and hold the hooks as shown in Fig. 6, at the time the kicker moves forward.

Fig. 7 shows the preferred method of construction for the dies with the insides hollow and with tubing connected so that a refrigerant may be used to control their temperature.

I am aware that prior to my invention, ice cream has been cut, shaped, stamped, molded and coated, in various ways by machinery. I therefore do not claim a combination broadly; but I claim—

1. In a stamping machine of the character described, reciprocating dies, means for operating the dies, means for feeding a strip of material to the dies, hooks extending upward between the dies and into the said material, means for moving the hooks intermittently and with the motion thereof cooperating with the movement of the dies, a track supporting said hooks, said track sloping downward from the dies conveying the hooks downward after leaving the dies, and means for removing objects stamped around the hooks by the dies with the hooks in the downward position after leaving the dies.

2. In a stamping and coating machine of the character described, suitable dies, means for operating the dies, means for intermittently feeding material to the dies, prongs on the said feeding means for supporting the material as it is fed to the dies and for conveying objects stamped from the material from the dies, said dies having fluid containing openings therein, means for supplying fluid to the openings in the dies for controlling the temperature thereof, means conveying said objects downward into a coating vat after leaving the dies, and means for removing the said objects.

3. In an ice cream forming machine of the character described, an endless feeder chain, means for moving the chain with an intermittent motion, means for holding a plastic material in a position parallel to the said chain, means on the said chain for engaging and holding the said plastic material at a plurality of points, means for shaping the said plastic material into individual objects around each of the said holding means, a vat adjacent the said chain, means conveying the said objects downward into the said vat and upward from the said vat to their normal positions, other means for conveying the said objects downward, and means for removing the said objects from the said chain holding means.

4. In a forming machine of the character described, a continuous chain, means for moving the chain with an intermittent motion, prongs extending from the said chain and pivotally attached thereto, means for raising and lowering the said prongs, means for supplying a material to a point adjacent the said chain, suitable dies for stamping the said material into shapes around the said prongs, said dies having openings in the backs thereof to relieve the vacuum as the dies recede from the said shapes, said prongs being adaptable to convey the said shapes from the said dies, and means for removing the said shapes from the said prongs.

5. In a forming machine of the character described, a plurality of prongs, means for moving the prongs with an intermittent motion, means for holding a material so that it will be engaged by the prongs, means for stamping the material into shapes upon the prongs, means for relieving the vacuum in the backs of the said stamping means as they move away from the said shapes, a suitable vat, means for moving the prongs to dip the said objects into the said vat, and means for removing the said objects from the said prongs.

6. In a forming machine of the type having reciprocating dies with material fed to the dies by an endless chain having an intermittent motion coordinated with the movement of the dies, prongs on the chain supporting said material before it reaches the dies and after it leaves the dies, means for passing a fluid through the dies to control the temperature thereof, means for dipping said material after leaving the dies into a coating vat, and means for removing said material from the said prongs.

MILLARD GEORGE HARNDEN.